(12) United States Patent
Cole et al.

(10) Patent No.: US 11,027,921 B2
(45) Date of Patent: Jun. 8, 2021

(54) PRODUCT MANIPULATION TOOL

(71) Applicant: ABB Schweiz AG, Baden (CH)

(72) Inventors: Gregory A. Cole, West Hartford, CT (US); Harald Staab, Neckargemuend (DE); Thomas A. Fuhlbrigge, Ellington, CT (US); Carlos Martinez, South Windsor, CT (US); Sangeun Choi, Simsbury, CT (US); Gregory F. Rossano, Enfield, CT (US); Jianjun Wang, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 138 days.

(21) Appl. No.: 16/380,351

(22) Filed: Apr. 10, 2019

(65) Prior Publication Data

US 2020/0324975 A1 Oct. 15, 2020

(51) Int. Cl.
*B25J 15/00* (2006.01)
*B65G 1/137* (2006.01)

(52) U.S. Cl.
CPC ........ *B65G 1/1373* (2013.01); *B25J 15/0014* (2013.01); *B25J 15/0052* (2013.01)

(58) Field of Classification Search
CPC .. B25J 15/0052; B25J 15/0014; B65G 1/1373
USPC ........................................................ 414/622
See application file for complete search history.

(56) References Cited

U.S. PATENT DOCUMENTS

| | | | |
|---|---|---|---|
| 4,318,655 A | 3/1982 | Svensson | |
| 4,561,686 A * | 12/1985 | Atchley | B66C 1/0206 294/188 |
| 4,789,295 A | 12/1988 | Boucher, Jr. et al. | |
| 5,232,332 A | 8/1993 | Focke | |
| 5,524,747 A * | 6/1996 | Wohlfahrt | B65G 59/023 198/512 |
| 5,993,134 A | 11/1999 | Williamson | |

(Continued)

FOREIGN PATENT DOCUMENTS

EP 3308877 A1 8/2018

OTHER PUBLICATIONS

European Patent Office, International Search Report in International Patent Application No. PCT/IB2020/053169, 5 pp. (dated Jul. 20, 2020).

(Continued)

*Primary Examiner* — Timothy R Waggoner
(74) *Attorney, Agent, or Firm* — Leydig, Voit & Mayer, Ltd.

(57) ABSTRACT

A product manipulation tool for interacting with products and containers at, for example, a retail facility can include a securing mechanism to secure an exposed portion of the container with respect to a horizontal surface such as a shelf. The product manipulation tool can also include a stabilizing device to stabilize the container with respect to the horizontal surface prior to securing the container. The product manipulation tool can also include a support structure for insertion underneath the container to support the load. The stabilizing mechanism may lift or tilt the container prior to insertion of the support structure. In an example, the product manipulation tool may be disposed on a mobile unit configured for locomotion about the retail facility.

20 Claims, 6 Drawing Sheets

(56) References Cited

U.S. PATENT DOCUMENTS

| | | | | |
|---|---|---|---|---|
| 6,332,750 | B1* | 12/2001 | Donner | B65G 59/023 |
| | | | | 414/796.9 |
| 6,652,014 | B2* | 11/2003 | Schmalz | B25J 15/0014 |
| | | | | 294/65 |
| 8,882,165 | B2* | 11/2014 | Lipson | B25J 15/12 |
| | | | | 294/86.4 |
| 9,498,887 | B1 | 11/2016 | Zevenbergen et al. | |
| 9,849,596 | B2* | 12/2017 | Bucknell | B25J 15/0023 |
| 2003/0123962 | A1 | 7/2003 | Mikulic et al. | |
| 2011/0268548 | A1 | 11/2011 | Doll | |
| 2015/0251319 | A1 | 9/2015 | Ishikawa et al. | |
| 2016/0023851 | A1* | 1/2016 | Gaenz | B65G 59/023 |
| | | | | 294/24 |
| 2017/0203443 | A1* | 7/2017 | Lessing | B25J 9/0027 |

OTHER PUBLICATIONS

European Patent Office, Written Opinion in International Patent Application No. PCT/IB2020/053169, 6 pp. (dated Jul. 20, 2020).

\* cited by examiner

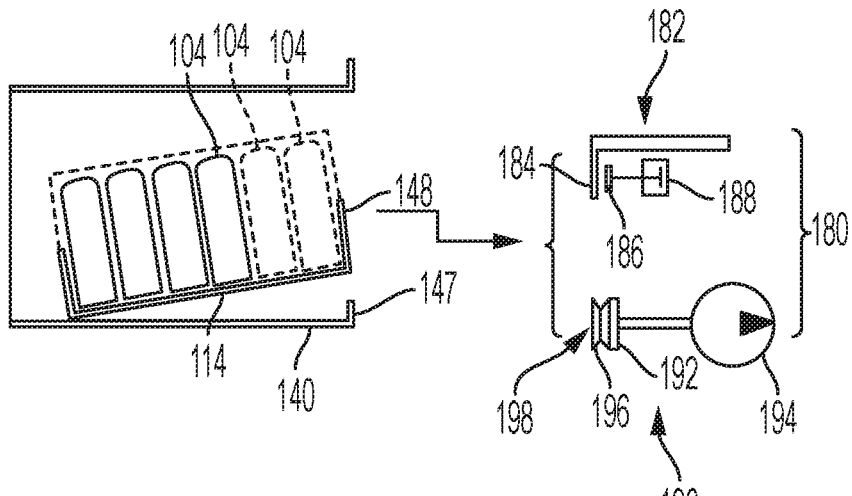
FIG. 3
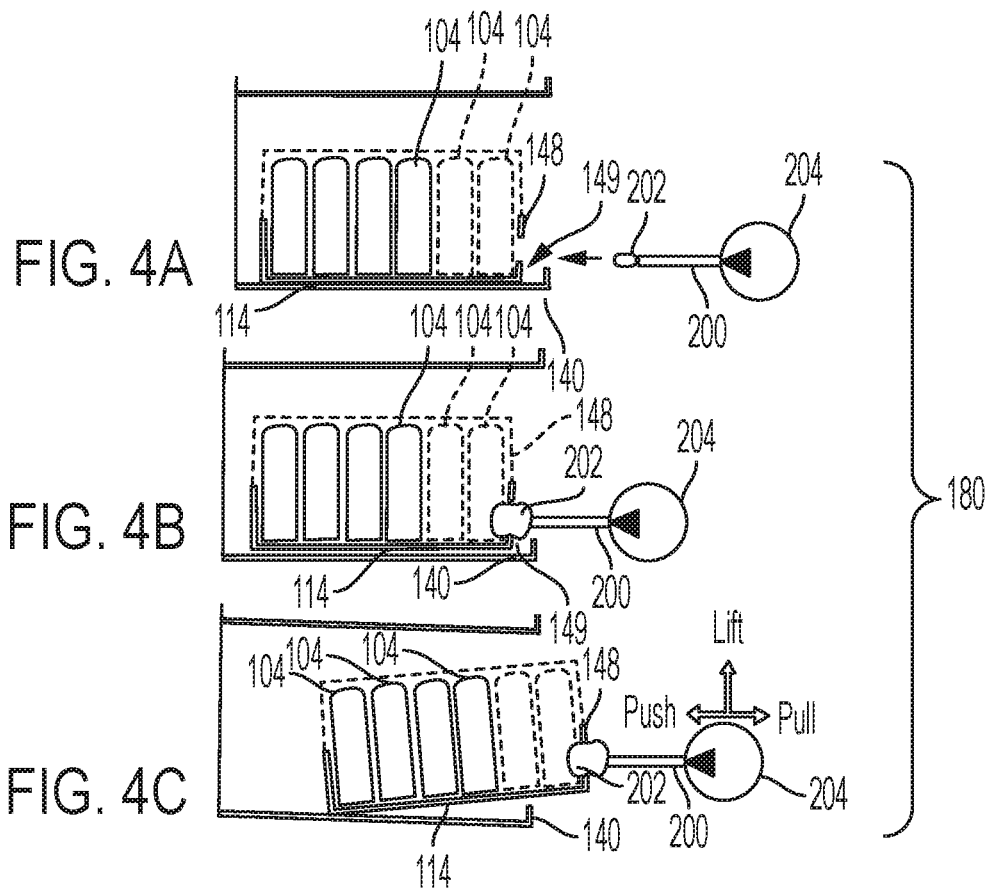
FIG. 4A
FIG. 4B
FIG. 4C

PRODUCT MANIPULATION TOOL

BACKGROUND

Automation is becoming increasingly more prevalent in many fields including through the use of robots or similar machines to automate certain tasks that traditionally have been performed by humans. For example, because robots and like machines are capable of performing a range of motions and movements to manipulate their surrounding environment, they may be used as storage and retrieval machines to automate the handling, manipulating, and movement of items from one location to another. In a retail store, for instance, robotic automation might be used to assist in stocking and replenishing products and goods for selection and purchase by customers. Such products and goods might be packaged in various containers of different shapes and sizes. Moreover, the containers should be handled in a manner that avoids damage, least customers perceive the items and goods themselves as damaged. The present disclosure is directed to the use of an automated storage and retrieval machine configured with a product manipulation device to manipulate and move products and containers for such purposes.

BRIEF SUMMARY

An automated storage and retrieval machine configured for manipulating and moving products and containers about a retail facility can include a product manipulation tool to physically interact with the products and containers. In various examples, the product manipulation tool may include a stabilizing device to stabilize a container with respect to a horizontal surface, a securing mechanism to physically secure the container, and a support structure for insertion underneath the container to support the load of the container when retrieving it from the horizontal surface. In an example, the product manipulation tool can stabilize the container from above with the stabilizing device prior to securing the container, secure and partially lift or tilt the container with the securing mechanism to expose the underside; and insert a support structure underneath the container to support the load.

BRIEF DESCRIPTION OF THE DRAWINGS

FIG. 3 is a block diagram illustrating possible examples of a securing mechanism that may be included with the product manipulation tool to physically secure and retain products or containers.

FIGS. 4a, 4b, and 4c are block diagrams illustrating an example of a securing mechanism configured as a mating connect to physically mate with a corresponding aperture disposed on the container.

DETAILED DESCRIPTION

Figure 1:
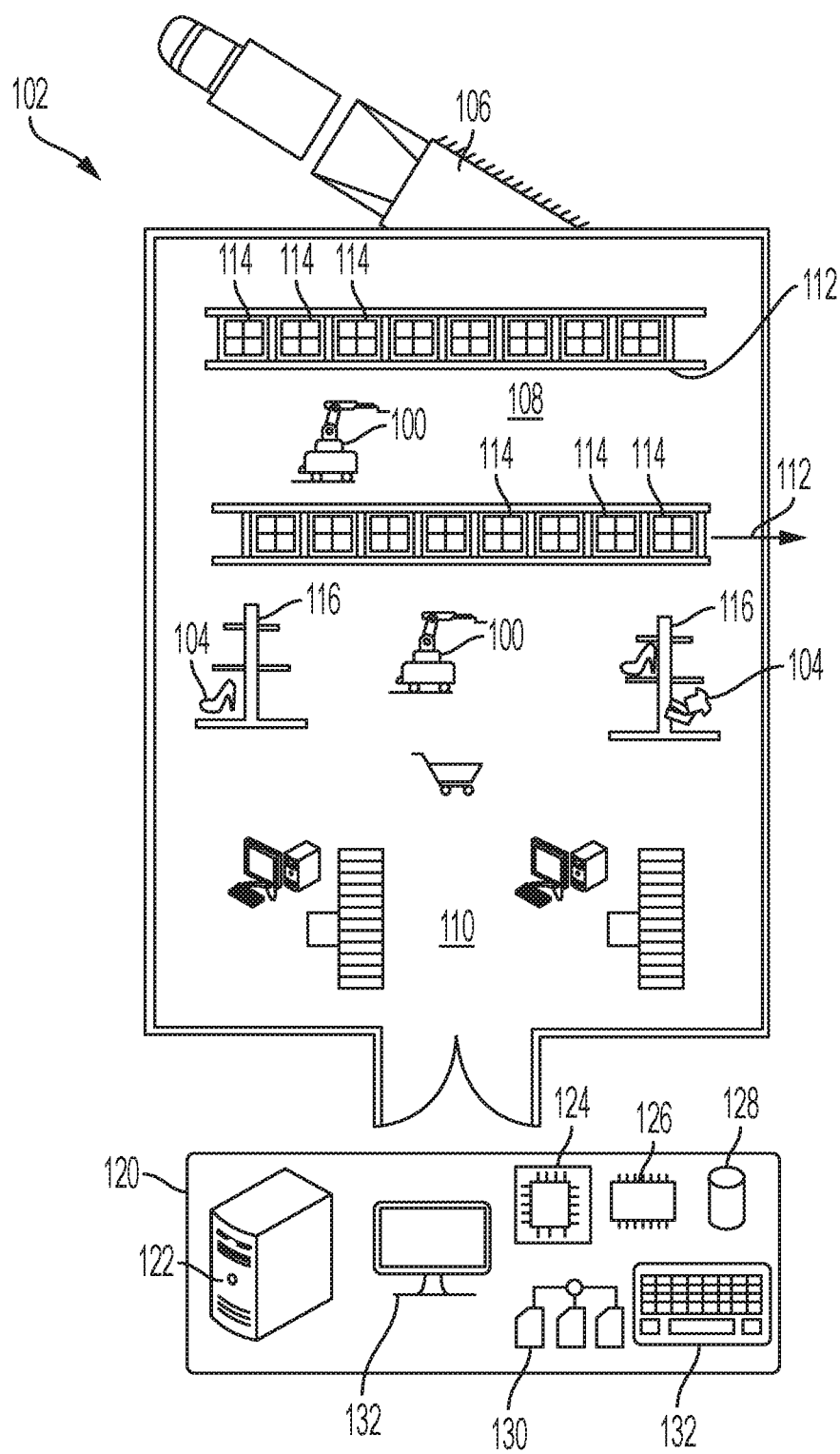
FIG. 1 is a schematic representation of a facility such as a retail store utilizing an automated storage and retrieval machine to access and move various items and goods between a receiving area, a storage area, and a point of sale location.

Now referring to the drawings, wherein like reference numbers refer to like elements, there is illustrated an environment in which an automated storage and retrieval machine 100 may be used to manipulate and/or move various items and goods. The illustrated environment may include a material handling facility in which the storage and retrieval machine 100 interacts with various items and goods and performs various tasks. As an example, the material handling facility may be a retail facility 102 or retail store where customers or end users may shop for, select, and purchase retail goods and products 104 for consumption. By way of example, these products 104 may be groceries and convenience products, shopping products such as clothes or books, specialty products, or any other suitable type of consumer items. Hence, the products 104 may be intended as final products for end consumption as differentiated from intermediate products used in the production of further products and goods. In accordance with the disclosure, however, the facility may be of another type such as a warehouse or distribution facility, a manufacturing facility for producing products and goods, a library, a hospital, or any other suitable example of a facility in which various types of items and products may need to be moved or transferred about.

A common operation at retail facilities 102 is the temporary storage and movement of products 104 through the facility. Accordingly, the retail facility 102 may be organized in a plurality of different areas intended for different purposes and functions with respect to the products 104 being handled. For example, the retail facility 102 may include a receiving area 106, a storage area 108, and a point-of-sale area 110. The receiving area 106 may be configured to accept the goods and products into the retail facility 102 from suppliers and may include a loading dock or other freight equipment for loading or unloading items and goods. The storage area 108 may be configured for the temporary receipt and storage of the products 104 received by the receiving area 106. Because the end products 104 and goods often arrive at the receiving area 106 in cartons, crates, or containers 114, the storage area 108 may include a plurality of storage units 112 to temporarily store the containers 114. In the illustrated example, the storage units 112 may be a plurality of shelving units or industrial racks configured to handle the containers 114. The storage units 112 may be arranged in aisles or otherwise and may be affixed to the floor of the retail facility 102; however, in another example, the aisles may be reconfigurable with movable storage units. The storage units 112 may also be pallets, flow racks, bins, cabinets, cases, floor locations, or other suitable storage configurations for storing items and goods. The point-of-sale area 110 may be where customers can interact with or inspect the products 104 for purchase. The point-of-sale area 110 can include various point-of-sales locations 116 such as tables, shelving, refrigerators, freezers, cooling cabinets, or the like and may include checkout lines or self-checkout machines.

To stock or retrieve the products 104 from the containers 114 in storage units 112 and move them to the point-of-sale locations 116, the storage and retrieval machines 100 can be mobile and adapted to move about the retail facility 102. Furthermore, to physically engage and interact with the products, the storage and retrieval machines 100 can include a material handling device or product manipulation tool 118 configured to grasp or secure the products. To further facilitate product handling and transportation, the storage and retrieval machines 100 may be operatively associated with an automated storage and retrieval system (ASRS). An ASRS is a computer-controlled system for placing and retrieving material or loads at predefined locations within a facility automatically in response to demand or according to a predetermined schedule. In addition to including one or more storage and retrieval machines 114, the ASRS may be operatively associated with various conveyors, rotating carousels, movable storage units, stackers, counting and sorting devices and equipment, and the like to facilitate movement of material through the facility. The ASRS may also be used to track material, monitor work progress, and maintain inventory counts to assist in operation of the facility.

To execute the operations associated with the ASRS, the retail facility 102 may be operatively associated with a computer system 120. The computer system 120 can include one or more computers 122 that may be configured as personal computers, laptops, notebooks, servers, mini-computers, or the like. Further, the functionality of the computer system 120 can be centralized on one computer 122 or distributed among a plurality of computers 122 networked together and the computer system may be considered a computer network to communicate and exchange information and data between various nodes. The computer system 120 may be associated with an architecture that defines its hardware and software components and their arraignment and the data processing capabilities of the system. For example, to execute instructions and process data, the computer system 120 can include one or more central processing units or processors 124 that includes the electronic circuitry to perform software operations. To store the software instructions and data, the computer system 120 can also include memory 126, which may be in the form of random access memory or other volatile memory, read only memory or other permanent memory, or another suitable form of memory. The processor 124 may be in direct or indirect digital or electronic communication with memory 126 to send and receive instructions and data. The computer system 120 may also include more permanent forms of memory 128 such as hard drives or backup disks having magnetic storage, optical storage, or other long term storage capabilities. The data that is processed and stored by processor 124 and the memory 126 may be associated with a data structure 130 that defines the organization and/or type of data. To interact with a user, the computer system 120 can also include one or more input/output interfaces 132 such as LCD or CRT displays, keyboards, mice, touchpads, etc.

The computer system 120 can be in operative communication with various controllers, terminals, scanners, sensors, and the like disposed about the retail facility 102 including the storage and retrieval machines 100. In particular, the computer system 120 can send and receive electronic signals in digital or analog formats to communicate with the storage and retrieval machines 100 and with other systems associated with the retail facility 102. The communication can occur via wires or buses, wirelessly such as by Bluetooth, fiber optical wave guides, or the like. The computer system 120 can be programmed or configured to assist in conducting operations at the retail facility 102. In an example, the computer system 120 can be part of an inventory management system that tracks, monitors, and manages the flow of the items and goods through the retail facility. The computer system 120 can cooperate with the storage and retrieval machines 100 in particular to transfer products 104 to and from the storage units 114 and the other areas of the material handling facility 100 such as the receiving area 106 and point-of-sale area 110. For example, in a retail facility 102, items and goods are typically held in bulk containers 114 in the storage area 108 until needed at the point-of-sale area 110. Various components or functions of the computer system 120 can be on-location or optionally remote or off-location.

Figure 2:
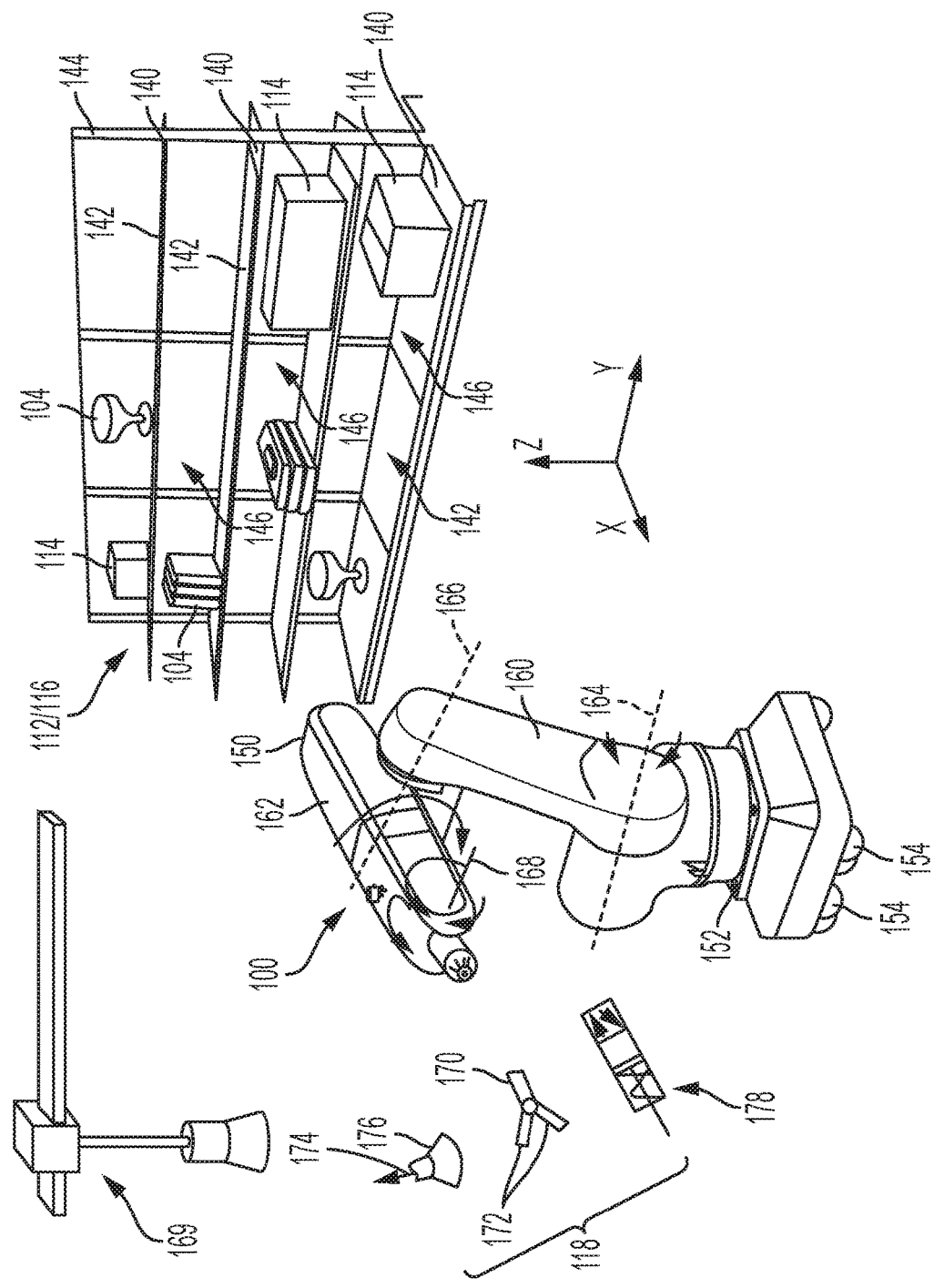
FIG. 2 is a perspective view of an example of the automated storage and retrieval machine within a retail facility and equipped with a product manipulation tool to retrieve or place products and containers on shelves.

Referring to FIG. 2, there is illustrated an example of the storage and retrieval machine 100 that might interact with products 104 and containers 114 and transfer them about the retail facility. To accommodate the products 104 and containers 114, the storage units 112 and/or the point-of-sale locations 116 may, in an example, be structured as an open shelving type arrangement with a plurality of horizontally arranged shelfs 140 each having an upward facing horizontal shelving surface 142 and that are vertically supported by an upright back panel 144. The empty spacing between the adjacent shelfs 140 may be referred to as receptacles 146 and can accommodate the products 104 and/or containers 114 placed on and supported by the shelfing surfaces 142. The open shelfing arrangement of the storage unit 112 and/or point-of-sale locations 116 provides sufficient accessibility to products 104 and containers 114 disposed on the shelfs 140 and are typically utilized in retail facilities of the foregoing types. However, in other examples, the storage unit 112 and/or point of sales location 116 can be configured as closed shelving arrangement, flow racks, slidable drawers, cabinets, floor locations, or the like.

To maneuver about and between the storage units 112 and/or point-of-sales locations 116, the storage and retrieval machine 100 in an example can be configured as a mobile unit adapted for locomotion and, in particular, can be configured as an articulated robotic arm 150 disposed on locomotive base 152 that functions as a vehicle for the robotic arm. In an example, to enable mobility, the locomotive base 152 may be supported by a plurality of powered wheels 154 that provide both drive and steering capabilities to facilitate maneuvering of the storage and retrieval machine 100. Power for operation of the storage and retrieval machine 100 can be provided by onboard rechargeable batteries or picked up from conductive tracks disposed through the facility. In other examples, the locomotive base 152 may utilize continuous tracks or can be rail or track mounted unit or may be suspended from the ceiling or overhead rails similar to a gantry crane. In other examples, rather than being a mobile unit, the storage and retrieval machine 100 can be disposed in a fixed location but having articulated or rotary joints movable in various degrees of freedom. The robotic arm 150 is therefore able to move with respect to the stationary storage units and/or point-of-sale locations.

To direct the mobile storage and retrieval machine 100 about the facility and to control and program the motions of the robotic arm 150, the storage and retrieval machine can be in operative communication with the computer system 120 associated with the retail facility in FIG. 1. In an example, the storage and retrieval machine 100 can be controlled by an operator remotely in real-time with transmitted signals or, in other examples, the storage and retrieval machine can be controlled according to a set of prepro-gramed instructions. Any suitable programming language and structures may be used for programming the storage and retrieval machine 100. The storage and retrieval machine 100 can include processors and memory for executing programs transferred to it from the computer system 120 which can operate the motors, actuators, and sensors operatively associated with the robotic arm 150. In other examples, the storage and retrieval machine 100 may operate autonomously or semi-autonomously.

To access, grasp, and move the products 104 or containers 114, the robotic arm 150 can be configured as a kinematic system including a plurality of rigid members linked by articulating or pivoting joints to move within a working envelope. The working envelope can be defined by a Cartesian coordinate system including a linear direction or axis, indicated by X, a horizontal direction or axis, indicated by Y, and vertical or elevational direction or axis, indicated by Z. The range of motion and possible movements of the robotic arm 150 can be determined by the number of axes or degrees of freedom and the dimensions of the rigid members. For example, the robotic arm 150 can include a first link or arm 160 and a second arm 162 that can be rigid, elongated members. The first arm 160 can be pivotally joined at one end to the base 152 to rotate about a first axis 164. The second arm 162 can be pivotally joined at the distal end of the first arm 160 to rotate about a second axis 166. An end effector, which in the illustrated example can be the product manipulation tool 118, can be pivotally joined to the distal end of the second arm 162 to rotate with respect to a third axis 168. The robotic arm 150 can be operatively associated with motors, solenoids, actuators, and drives to articulate the joints in a controlled manner. In other examples, the storage and retrieval machine 100 can have other suitable configurations such as, for example, a gantry crane 169 as illustrated in FIG. 2 or a Cartesian coordinate type robot.

To physically interact with the products 104 or containers 114, the end effector or product manipulation tool 118 disposed at the distal end of the robotic arm 150 can utilize any of various suitable operating principles. In an example, the product manipulation tool 118 can be configured as a gripper 170 that can securely grasp and hold an object. The gripper 170 may include multiple jaws or fingers 172 that extend about the object and physically secure the object utilizing a clamping or force closure effect. The fingers 172 may be bifurcated and articulable with respect to each other to open and close. To help secure the object being grasped, the fingers 172 can be covered in a compliant material such as an elastomer. Grippers 170 of this type restrain the object utilizing the frictional interaction between the gripper and the object. In another example, the product manipulation tool 118 may be configured as a fluid pressure device 174 using suction or fluid transfer principles to secure the object via a vacuum or suction cup 176 or the like. Another example of a product manipulation tool 118 includes support elements 178 that are extendable and retractable with respect to an object to support and carry the object. As shown FIG. 2, the support elements 178 can be extend by pneumatic or hydraulic cylinders or similar actuators. Other examples include mating connectors that operate based on form-fit or mate-grasping interaction between the product manipulation tool and the object.

Because many retail facilities utilize vertical shelfs 140 on which the products 104 or containers 114 may be adjacently disposed on horizontal shelving surfaces 132 in a close packed configuration, the product manipulation tool 118 may be configured or arranged to access the closed packed products or container. In a close packed configuration, multiple products or containers are placed in a side-by-side or stacked relation with individual products or containers abutting each other. The close packed configuration may be facilitated if the products or containers are polyhedron in shape such as a square or rectangle. The close packed configuration facilitates efficient use of storage space and maximizes storage density. However, the close packed configuration also impedes access to individual products 104 and containers 114 on the shelfs 140 by the product manipulation tool 118 on the storage and retrieval machine, thereby hampering automation.

Referring to FIG. 3, there is illustrated two examples of a securing mechanism that may be included with the product manipulation tool 118 to secure and retrieve the products 104 or containers 114 that may be disposed in a close packed configuration on the shelf 140. In the close packed configuration, only a limited portion of the container 114 such as the vertical front wall or panel 148 may be accessible and exposed for interaction with the product manipulation tool 118. Further, in the illustrated example, the shelf 140 may include a vertical lip 147 or similar feature that prevents the products 104 or container 114 from being directly slid off from the shelf.

Therefore, to physically secure and retrieve the container 114, the securing mechanism 180 may, in the illustrated example, may be a pincher clamp 182. To engage the pincher clamp 182, the container 114 may have a polyhedron-like shape and may be formed as an opened crate so that the front wall 148 of the container 114 is generally accessible. A plurality of products 104 may further be disposed in the create-like container 114. The pincher clamp 182 can include first and second opposed jaws 184, 186 that can be linearly moved together or apart to create the grasping action similar to the aforementioned gripper. In the illustrated embodiment, the jaws 184, 186 are positioned so they move horizontally with respect to the upper surface of the shelf 140 to grasp an object within the vertical plane. To enable the first and second jaws 184, 186 to move with respect to each other, pincher clamp 180 can include an actuator 188.

To secure the container 114, the storage and retrieval tool maneuvers the pincher clamp 182 proximate to and aligned above the front panel 148. The first jaw 184 can then be placed over the upper edge of the front panel 148 and into the container 114 so the front panel 148 is disposed between the first and second jaws 184, 176. To enable the pincher clamp 182 to access the front panel 148, the products 104 may be offset therefrom by a separator inside the container 114 or the like. When first and second jaws 184, 186 are moved together, they cooperate to pinch and grasp the front panel 148, allowing the pincher clamp 182 to lift and/or retrieve the container 114 from the shelf 140 and partially out of the close packed configuration. The pincher clamp 182 is therefore a variation of a force or frictional grasping method in which the object is held due to a clamping force and prevented from sliding away from the retrieval tool due to frictional interaction. In other examples, the securing mechanism 180 may be configured with bifurcated first and second fingers that are pivotally interconnect and that can articulate with respect to each other to clamp the front panel 148 of the container 114 vertically therebetween, as described with respect to FIG. 2.

Because the pincher clamp requires an opened container 114 to provide an exposed surface to secure, which may not be desirable, in another example, the securing device 180 can be a fluid pressure device 190 such as, for example, a suction cup and a pressure source that generates a suction force against and object by application of negative pressure. In FIG. 3, the fluid pressure device 190 can include a suction cup 192 operatively associated with a low pressure source 194 such as a vacuum pump or Venturi tube. The suction cup 192 may be made of flexible elastic material shaped as a cup having a curved surface 196 defining a volume or void 198. The robotic arm associated with the storage and retrieval machine can align the suction cup 192 with the front panel 148 of the container 114, which may be a flat, non-porous surface. The suction cup 192 can then be pressed against the front panel 148, flatting the curved surface 196 and forming a seal between the cup and panel. Negative pressure is then applied creating a vacuum between the suction cup 192 and front panel 148 to adhere the container 114 to the securing device 180.

Referring to FIGS. 4a-4c, there is illustrated an example of a securing mechanism 180 in the form of a mating connector 200 that operates on a form-fit or mate-grasping principle. To mate the mating connector 200 with the container 114, the front panel 148 can include an aperture 149 disposed therein of any suitable shape or size. The mating connector 200 can have a complementary shape or size to be received in the aperture. When mated, the mating connector 200 and the aperture 149 form a secure connection between the securing mechanism 180 of the product manipulation tool and the container 114. In an example, to facilitate the mating connection, the mating connector 200 may have an inflatable tip 202 coupled to a fluid pressure source 204 such as a pump. As illustrated in FIG. 4a, the inflatable tip 202 is first maneuvered to align with the aperture 149 while the container 114 is disposed on the shelf 140. As illustrated in FIG. 4b, the securing mechanism 180 is extended toward the front panel 148 to insert the inflatable tip 200 into the aperture 149. The inflatable tip 200 may be dimensioned such that it can be readily received with in the aperture 149 when deflated. Once inserted, the fluid pressure source 204 can be activated to expand the inflatable tip 202 in the aperture 149, thereby interlocking the mating connector 200 and the container 114. Thereafter, as illustrated in FIG. 4c, the securing mechanism 180 via the mating connector 200 can manipulate the container 114, for example, by lifting, pushing or pulling the container. The inflatable tip configuration may be particularly useful in facilities where products are placed in plastic containers or crates customized to that facility and product, with the plastic providing sufficient strength to accommodate the inflated tip. Another technique to secure the securing mechanism 180 and the container 114 is use of electromagnetic attractive forces, for example, permanent or electromagnets.

Figure 5:
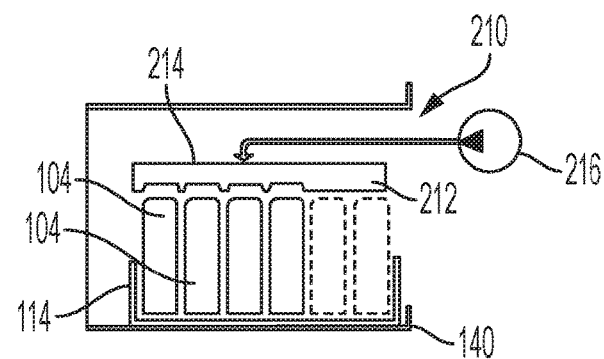
FIG. 5 is a block diagram illustrating a possible example of a stabilizing device that may be included with the product manipulation tool to stabilize the container with respect to a horizontal surface.

To prevent the product 104 or container 114 from being displaced when physically engaging the securing mechanism 180 shown in the example of FIG. 5, the product engagement tool 118 can include a stabilizing device 210 that stabilizes the relative location of the product 104 and container 114 on the shelf 140. In particular, the stabilizing device 210 can prevent displacement of an object by holding it in place prior to engagement with the securing mechanism 180, and may further prevent products 104 disposed within opened-style containers 114 from falling or spilling. The stabilizing device 210 can hold the product 104 or container 114 down from above and may include a compliant feature to conform to the shape or height of the product or container that may not be well defined. In an example, the compliant feature 212 may utilize a passive method using resilient foam, a deformable plastic, a granular filled bag similar to a bean bag, or a sponge that conforms to the upper surface of the products 104 or container 114. In another example, the complaint feature 212 may utilize an active method such as an inflatable bag 214 operatively associated with a pressure source 216. When positioned over the product 104 or container 114 and inflated, the inflatable bag 214 expands to contact and press the product 104 or container 114 downward thereby stabilizing it against the shelf 140 and with respect to the securing mechanism while still conforming to the height or shape of the object. The inflatable bag 214 can be made from any suitable, pliable, non-porous material such as rubber sheets or thermoplastic fabrics. In addition, to facilitate conformance with the height or shape of the object, the inflatable bag 214 may include a plurality of individual cells or bladders, or a plurality of smaller individual inflatable bags may be utilized.

Figure 6A:
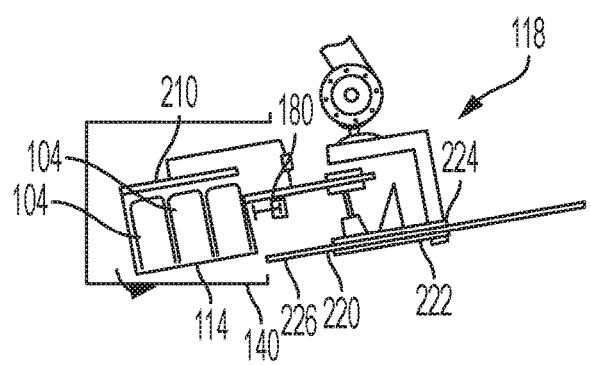
FIGS. 6a and 6b are block diagrams illustrating a possible example of a support structure that may be included with the product manipulation tool and that may be inserted underneath the container to support the load of the container.
Figure 6B:
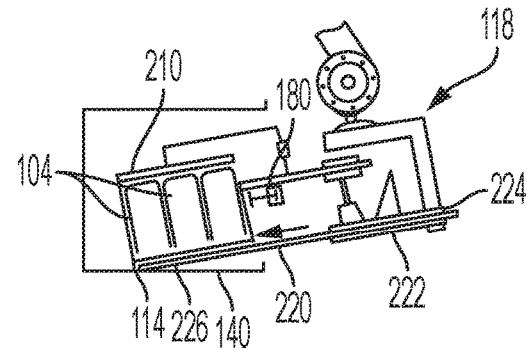

Because the various products 104 and containers 114 encountered in a retail facility may have different weights, and the containers may be made of different materials and have different internal packing configurations, the securing mechanism 180 may be insufficient to secure the container for a prolonged period after initial lifting from the shelf 140. For example, because the securing mechanism 180 might only secure the vertical front panel 148 of the container 114, the front panel may tear or the securing mechanism may be damaged if supporting the full load of the products and container. Referring to FIGS. 6a and 6b, to support the load of the products 104 and container 114 after lifting from the shelf 140, the product manipulation tool 118 can include a lower support structure 220 for placement underneath the container. The support structure 220 may be positioned under the center of gravity of the container 114 to support the load and relieve the forces applied to the securing mechanism 180.

In the illustrated example, the support structure 220 can be constructed as a plate, spatula or forks that is extendable and retractable with respect to the rest of the product manipulation tool 118. The support structure 220 can be accommodated a lower base 222 positioned below the securing mechanism 180. Referring to FIG. 6a, as the securing mechanism 180 initially lifts the products 104 in the container 114 from the shelf 140, the support structure 220 can be partially retracted into a slot or channel 224 disposed in the lower base 222 so the securing process is unobstructed. When the container 114 is initially lifted or tilted with respect to the shelf 140, the support structure 220 is longitudinally extended from the lower base 222 between the underside of the container and the shelf. When underneath the container 114, the support structure 220 can support at least a portion of the load and possibly the full load of the container. Extension and retraction may be accomplished by electric motors with gear trains, hydraulic or pneumatic cylinders, or any other suitable mechanism. To facilitate extension underneath the container 114, the distal tip 226 of the support structure 220 may be beveled or configured with rollers.

Figure 7:
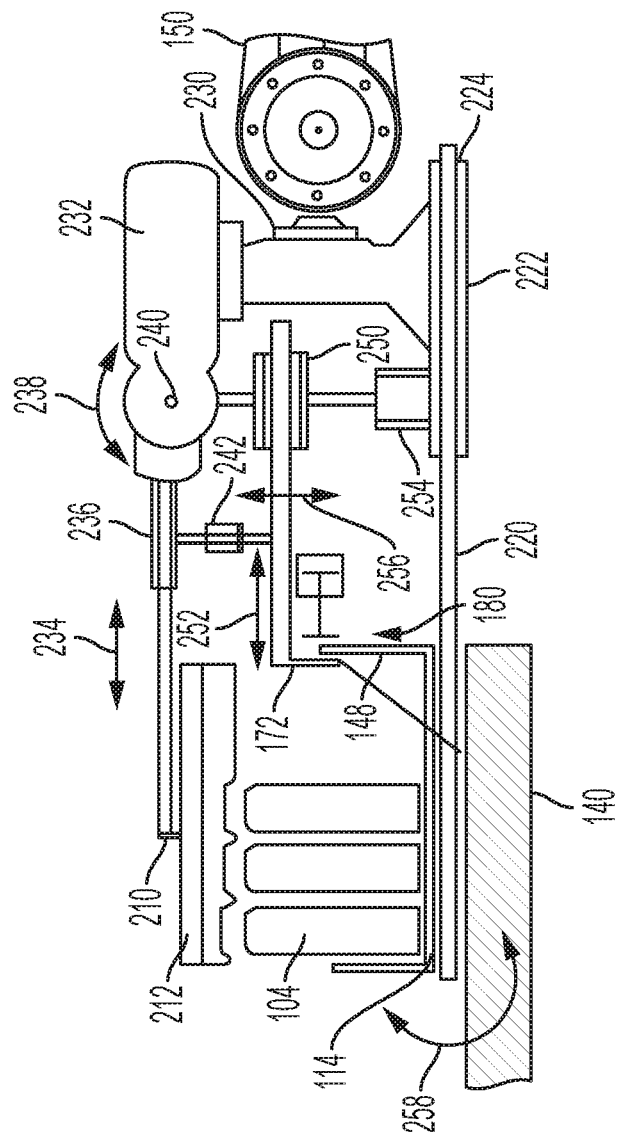
FIG. 7 is a block diagram of a possible example of various possible components of the product manipulation tool configured in a movable arrangement with respect to each other to interact with products and containers of differing heights and sizes.

To physically interact with products 104 and container 114 of different sizes and heights, the various components of the product manipulation tool 118 may be movable with respect to each other in a cooperative manner. Referring to FIG. 7, there is illustrated an example of the components of the product manipulation tool 118 operatively mounted to and arranged in an adjustably spaced relation on a carriage 230 that may be fixedly attached to the distal end of the robotic arm 150. The rigid, fixed carriage 230 can thereby maintain the spaced apart relations and alignments of the various components of the product manipulation tool 118. In the illustrate example, the stabilizing device 210 can be upwardly mounted on the carriage 230 above the securing mechanism 180 and the lower base 222 can be mounted to the carriage so the support structure 220 is disposed below the securing mechanism. Furthermore, the product manipulation tool 118 can include various actuators to move the components relative to the carriage 230 and each other during a lifting and retrieval operation.

Referring to FIGS. 6 and 7, the following is an example of a retrieval process 300 to retrieve a product 104 or container 114 from a horizontal surface such as a shelf 140 using the product manipulation tool 118. The process 300 can be encoded as software storable in and retrievable from memory, such as ram or rom, and executable by a processor or the like and may include instructions, commands, and data written in computer executable programming code. In an alignment step 302, the robotic arm 140 is maneuvered to align the product manipulation tool 118 vertically proximate with and longitudinally in front of the front panel 148 or other exposed area of the container 114 on the shelf 140. It can be appreciated that a plurality of containers may be configured in a close packed configuration, thereby limiting access of the product manipulation tool except for the exposed front panel. Maneuvering of the robotic arm 150 may also involve locomotion of the automated storage and retrieval machine on which the product retrieval tool is disposed.

In a stabilizing step 304, the product manipulation tool 118 maneuvers the upper stabilizing device 210 above the container 114 to stabilize the container and products prior to securing them. To accomplish the stabilizing step 304, the upper stabilizing device 210 can be operatively associated with an upper body 232 of the carriage 230 that houses the actuators to move the stabilizing device. For example, the stabilizing device 210 can be longitudinally extendable and retractable, as indicated by arrow 234, via a stabilizer extension mechanism 236 that may be configured as a telescopic structure associated with the upper body 232 and can be vertically swung, as indicated via arrow 238 via a pivot mechanism 240 associated with the upper body 232. In another example, the vertical motion of the stabilizing device 210 may be assisted or controlled by a stabilizer vertical actuator 242. Hence, in the stabilizing step 304, the compliant structure 212 is longitudinally positioned above the products 104 and container 114 by the extension mechanism 234 and lowered thereon by the pivot mechanism 236. If the complaint structure 212 is an inflatable bag, it may be inflated to conform in shape with the products 104 or container 114.

In a securing step 306, the securing mechanism 180 is maneuvered to secure the exposed front panel 148 of the container 114. For example, the securing mechanism 180 can be longitudinally extended and retracted by a securing extension mechanism 250 with respect to the container 114 and the carriage 230, as indicated by arrow 252, to longitudinally align with the front panel 148. The securing mechanism 180 can also be vertically raised and lowered with respect to the container 114 and carriage 230 by a securing vertical actuator 254 to vertically align the securing mechanism with the front panel 148, as indicated by arrow 256. When aligned, the securing mechanism 180, for example, the pincher clamp 182, can be activated during the securing step 306 to grasp the exposed front panel 148 and to secure and restrain the container 114.

In a lifting/tilting step, 308 the products 104 and container 114 can be initially lifted with respect to the shelf 140 by the securing mechanism 180 to expose the underside of the container. The lifting/tilting step 308 can be accomplished by vertically raising the securing mechanism 180 with respect to the carriage 230 via the securing vertical actuator 254, or by raising the product manipulation tool 118 via the robotic arm 150. If the securing mechanism 180 secures the front panel 148 of the container 114, it can be appreciated the rest of the container may tilt or pivot with respect to the shelf 140 as indicated by arrow 258. To thereafter support the load of the products 104 and the container 114, in an insertion step 310, the support structure 220 can be inserted between the underside of the container and the upper surface of the shelf 140 by extending the support structure 220 from the lower base 222. The position of the lower base 222 and the channel 224 disposed therein on the carriage 230 can be arranged to align and guide the support structure 220 during insertion underneath the container 114. When the support structure 220 is approximately underneath the center of gravity of the products 104 and container 114 and thereby supporting all or a substantial portion of the load, in a removal step 312 the products and container can be removed from the shelf 140 by appropriate maneuvering of the robotic arm 150. To place products 104 and a container 114 on a shelf 140, for example in a placement operation, the foregoing steps of the retrieval operation 300 and the associated motions of the product manipulation tool 118 can be reversed.

Figure 8:
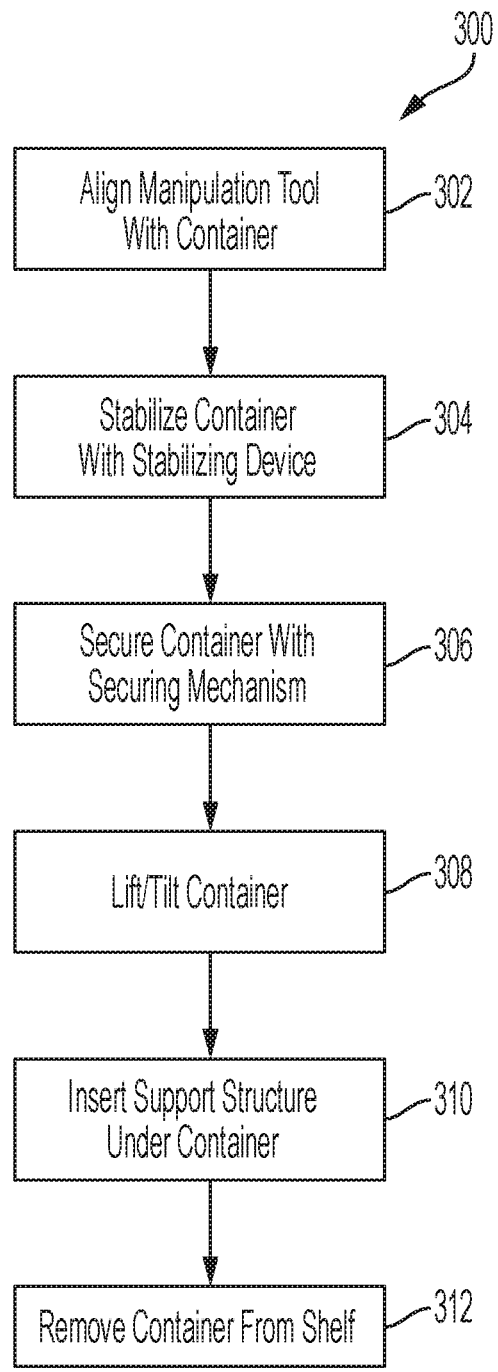
FIG. 8 is a flowchart illustrating a possible example of a process or routine by which the product manipulation tool may access and retrieve a container located on a horizontal surface.

The retrieval process 300 described with respect to FIG. 8 is exemplary only and the order of steps may be modified and steps may be added or removed. For example, the stabilizing step 304 might occur after the insertion step 310 by inserting the support structure 220 below the container 114 prior to moving the stabilizing device 210 longitudinally over the products. This order of steps results in the container 114 being adequately support from below prior to application of a downward force form the upper stabilizing device 310, which may otherwise hinder the insertion of the support structure.

In a further example, the automated stocking and retrieval machine 100 including the product manipulation tool 118 may be operatively associated with one or more sensors for obtaining information and feedback during operation. For example, the sensors may be visual or optical sensors such as a camera that can capture a visual image of the surrounding environment. The captured images can be used to determine the presence or absence of the product or container on the shelf or other storage unit, the shape and size of the product or container, the orientation of the product or container, and similar information to assist navigating and maneuvering the production manipulation tool during a retrieval or placement operation. In particular, the sensors can be used to locate an exposed area or region of the containers for securing with the securing mechanism when several containers are disposed in close packed configuration. In addition, the sensors may be used to determine the weight or load of the products or containers, which can be used deploying and balancing the container on the support structure. Other examples of sensory devices may include LIDAR, radiofrequency sensors, motion sensors, inertial measurement units, audio sensors, magnetic sensors, GPS and the like.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A product manipulation tool for an automated storage and retrieval machine comprising:
   a securing mechanism for securing an exposed portion of a container disposed on a horizontal surface;
   an upper stabilizing device in the form of an inflatable bag positionable above the container for stabilizing the container with respect to the horizontal surface from above; and
   and lower support structure for insertion underneath the container to support the load of the container.

2. The product manipulation tool of claim 1, wherein the securing mechanism is selected from the group comprising a gripper with bifurcated fingers, pincher clamp, a fluid pressure device with a suction cup, and a mating connector.

3. The product manipulation tool of claim 2, wherein the mating connector is a male connector configured to mate with an aperture in the exposed portion of the container.

4. The product manipulation tool of claim 3, wherein the male connector includes an inflatable tip to inflate within the aperture.

5. The product manipulation tool of claim 1, wherein the upper stabilizing device includes a compliant feature conformable to the container.

6. The product manipulation tool of claim 5, wherein the compliant feature is selected from the group comprising resilient foam, deformable plastic, a granular filled bag, and an inflatable bag.

7. The product manipulation tool of claim 1, wherein the lower support structure is longitudinally extendable and retractable from a lower base of the product manipulation tool.

8. The product manipulation tool of claim 7, wherein the lower support structure is selected from the group comprising a flat plate, a spatula, and a multi-tined fork.

9. The product manipulation tool of claim 1, wherein the securing mechanism and the stabilizing mechanism are vertically adjustable with respect to each other.

10. The product manipulation tool of claim 1, wherein the securing mechanism is longitudinally extendable with respect to the rest of the product manipulation tool.

11. The product manipulation tool of claim 1, wherein the product manipulation tool is configured to be fixedly attached to a distal end of a robotic arm.

12. A method of retrieving a container from a horizontal surface comprising:
   stabilizing the container with respect to the horizontal surface from above with an upper stabilizing device by inflating an inflatable bag extended over the container;
   securing an exposed portion of the container with a securing mechanism;
   tilting the container on the horizontal surface by raising the securing mechanism;
   inserting a support structure between the container and the horizontal surface; and
   supporting the load of the container with the support structure contacting the underside of the container.

13. The method of claim 12, wherein the step of securing the container includes grasping a front panel of the container.

14. The method of claim 13, wherein the step grasping the front panel includes closing opposing first and second jaws of a gripper.

15. The method of claim 12, wherein the step of securing the container includes mating a mating connector of the securing mechanism with an aperture disposed in the front panel.

16. The method of claim 15, wherein the step of mating includes inflating an inflatable tip of the mating connector within the aperture.

17. An automated storage and retrieval machine for stocking and retrieving containers in a retail facility comprising:
   a mobile unit configured for locomotion about the retail facility;
   a product manipulation tool disposed on the mobile unit, wherein the product manipulation tool includes:
      a stabilizing device in the form of an inflatable bag positionable above the container for stabilizing the container with respect to a horizontal surface prior to securing the container;
      a securing mechanism for securing the container and tilting the container with respect to the horizontal surface; and
      a support structure for insertion underneath the container to support the load of the container.

18. The automated storage and retrieval machine of claim 17, wherein:
   the stabilizing device is selected from the group comprising resilient foam, deformable plastic, a granular filled bag, and an inflatable tip; and
   and the securing mechanism is selected from the group comprising a gripper with bifurcated fingers; and pincher clamp, a fluid pressure device with a suction cup, and a mating connector.

19. The automated storage and retrieval machine of claim 17, wherein the mobile unit includes a robotic arm and the product manipulation tool is disposed at the distal end of the robotic arm.

20. A product manipulation tool for an automated storage and retrieval machine comprising:
   a male connector adapted to be received in an aperture disposed into a front panel of a container, the male connector including an inflatable tip;
   a pressure source in fluid communication with the inflatable tip for expanding the inflatable tip within the aperture and
   a stabilizing device in the form of an inflatable bag positionable above the container for stabilizing the container with respect to a horizontal surface.

* * * * *